Nov. 9, 1926.  
G. G. KAESTNER  
1,606,640  
LIQUID METER  
Filed Oct. 23, 1924
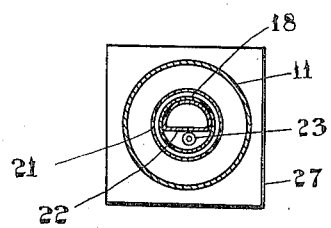
FIG.2
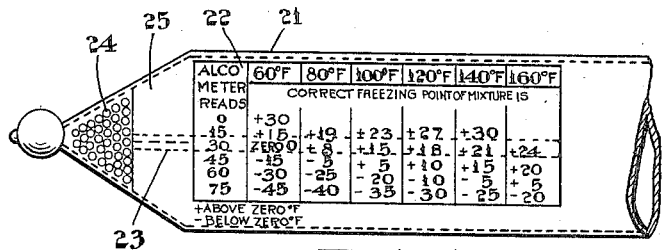
FIG.4
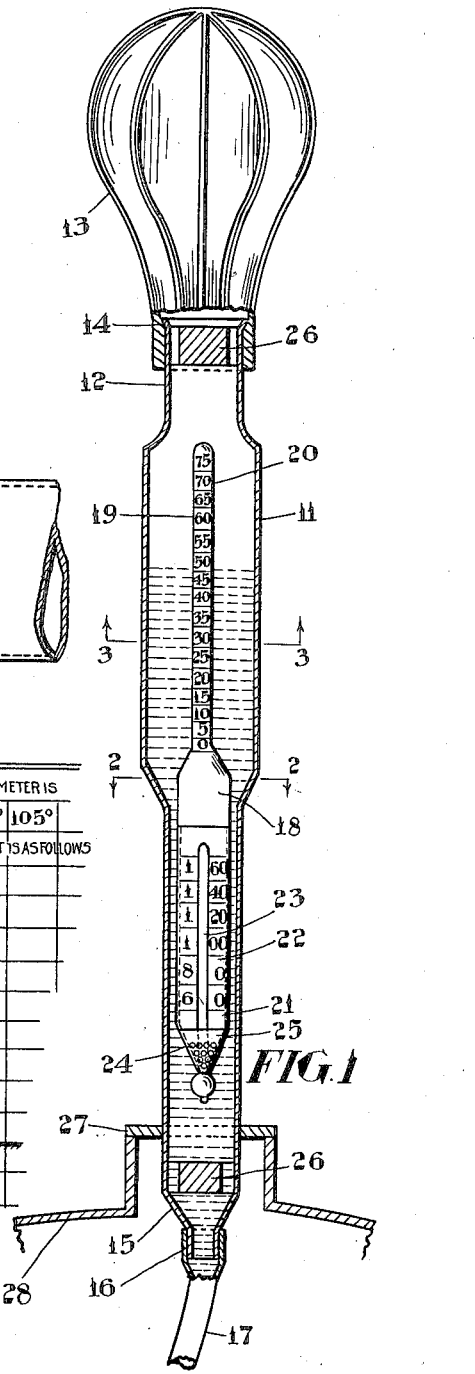
FIG.1
| WHEN ALCOMETER READS (ON STEM) | WHEN TEMPERATURE BY THERMOMETER IN BULB OF ALCOMETER IS | | | | | | | | | |
|---|---|---|---|---|---|---|---|---|---|---|
| | 60° | 65° | 70° | 75° | 80° | 85° | 90° | 95° | 100° | 105° |
| 0 | +30 | 31 | 32 | ACTUAL FREEZING POINT IN FAHRENHEIT IS AS FOLLOWS | | | | | | |
| 5 | +25 | 26 | 27 | 28 | 39 | 30 | 31 | 32 | | |
| 10 | +20 | 21 | 22 | 23 | 24 | 25 | 26 | 27 | 28 | |
| 15 | +15 | 16 | 17 | 18 | 19 | 20 | 21 | 22 | 22 | |
| 20 | +10 | 12 | 13 | 15 | 16 | 18 | 19 | 20 | 21 | |
| 25 | +5 | 7 | 9 | 11 | 12 | 14 | 16 | 17 | 18 | |
| 30 | ZERO 0 | 2 | 4 | 6 | 8 | 10 | 12 | 14 | 15 | |
| 35 | −5 | 3 | 0 | 2 | 4 | 6 | 8 | 10 | 11 | |
| 40 | −10 | 8 | 5 | 2 | 0 | 2 | 4 | 6 | 7 | |
| 45 | −15 | 13 | 10 | 8 | 5 | 3 | 1 | 1 | 3 | |
| 50 | −20 | 19 | 17 | 14 | 12 | 10 | 8 | 6 | 4 | |
| 55 | −25 | 24 | 23 | 21 | 19 | 17 | 16 | 14 | 12 | |
FIG.5
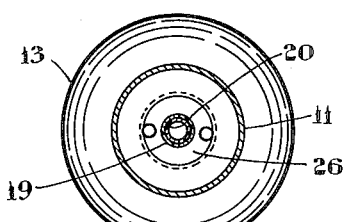
FIG.3
INVENTOR  
GEORGE. G. KAESTNER  
BY Fetherstonhaugh & Co  
ATTORNEYS Patented Nov. 9, 1926.

1,606,640

UNITED STATES PATENT OFFICE.

GEORGE G. KAESTNER, OF MONTREAL, QUEBEC, CANADA, ASSIGNOR TO CANADIAN INDUSTRIAL ALCOHOL COMPANY LIMITED, OF MONTREAL, CANADA.

LIQUID METER.

Application filed October 23, 1924. Serial No. 745,449.

This invention relates to new and useful improvements in alcohol meters and the object of the invention is to provide a device of the class stated, from which the freezing point of mixtures of alcohol and water may be determined without subjecting the mixture to chemical analysis.

Another object is to provide a device of the class stated, which will be efficient and accurate in operation and easily manipulated by the ordinary layman.

This invention is particularly adaptable for use in determining the freezing point of automobile engine anti-freezing cooling mixtures, which may consist of denatured alcohol and water placed in the radiator of automobiles and adapted to circulate around the engine parts to cool same. Such mixtures are used particularly in driving in the winter time and must be of the proper proportions to prevent freezing of same when subjected to the lowest atmospheric temperature. In my invention, I provide a simple syringe type of test tube within which is mounted an aerometer or hydrometer having a thermometer mounted therein. I also provide tables within the hydrometer for registering the temperature of the mixture and also its alcoholic content. Another table is also provided and placed within the hydrometer for determining the freezing point of the mixture from the combined temperature and hydrometer readings. A separate chart may also be provided for reading more accurate results.

In the drawings:—

Figure 1 is a side elevation of the device shown partly in section.

Figure 2 is a sectional plan taken on the line 2—2 Figure 1.

Figure 3 is a sectional plan of the device taken on the line 3—3 Figure 1.

Figure 4 is an enlarged partial elevation of the lower part of the hydrometer, showing the chart of freezing temperatures of certain mixtures.

Figure 5 is a partial plan of a chart which may be supplied with the device.

Referring more particularly to the drawings, 11 designates a test tube, which is made of glass or other transparent material. Attached to the upper end or neck 12 of the tube is the bulb 13, which is held in position by the rim 14 of the neck. The lower end 15 of the test tube is provided with an apertured extension 16, to which may be attached a piece of flexible tubing 17. Within the tube 11 is placed the hydrometer, designated as a unit by the reference numeral 18. Within the upper portion or stem 19 of the hydrometer, a piece of paper 20 is placed and on said paper is marked a series of numbers extending from 0 to 75, as indices of the amount of alcohol contained in the fluid. The point marked "0" indicates the position of pure water at 60° Fahrenheit. As alcohol is added to the water, the hydrometer sinks and the figures above the numeral 0 are indication of the alcohol content. Within the lower portion or float body 21 of the hydrometer is mounted a chart 22, having printed on one side thereof markings indicating the temperature of the liquid by means of a mercury or like thermometer 23 mounted between the chart and the inner surface of the tube. The other side of the chart, which is shown in Figure 4, has printed thereon a table of freezing temperatures, which is controlled by the temperature of the liquid and the alcoholic content of same. A plurality of weights 24 are placed in the lower portion of the hydrometer to hold same in the vertical position while the liquid is under test. These weights may be held in position by wax or other compound 25. Within the tube 11 are mounted the rubber washers 26, which may be provided with apertures to allow free passage of the mixture therethrough. The washers limit the movement of the hydrometer, so that same may be in constant view of the operator. They also act as cushions or buffers against which the ends of the tube may collide during the handling of the instrument. A washer 27 may be provided to prevent the instrument from falling into the radiator 28, a portion of which is shown in Figure 1. An enlarged chart 29 may be provided, so that more accurate readings may be obtained. The top horizontal figures indicate rises of five degrees in temperature, while side vertical figures start at 0 and read downwardly to a maximum of 75, and indicate reading from the stem of the hydrometer. The other figures in the chart indicate freezing temperature in degrees Fahrenheit, the numerals or figures above the shaded zig-zag line denoting degrees above zero and the figures below indicating temperatures below zero.

Modifications may be made in the device without departing from the spirit of the invention. Such modifications may be made by pressing or painting the figures in the glass of the hydrometer instead of mounting paper charts or tables therein.

The method of operation is as follows:

The flexible tube is placed within the radiator, the flexible bulb compressed and a quantity of tne fluid in the radiator sucked into the test tube, as shown in Figure 1. In the example shown, the marking on the stem indicates 50. The temperature is shown as 65° F. The freezing point of the mixture is arrived at by consulting the table under the numeral 65° on the top line on the chart, and on the horizontal line indicated by the numeral 50 on the left hand side of the chart. The freezing temperature of the mixture is given as 19° Fahrenheit, below zero. It will be readily understood that this instrument can be used by the ordinary layman to obtain an accurate reading of the freezing point of any unknown mixture of denatured alcohol and water.

Having thus described my invention, what I claim is:—

A device for determining the freezing point of alcoholic mixtures including a hydrometer formed of transparent material and having its lower portion made of greater diameter than its upper portion, a paper chart enclosed in the upper portion of the hydrometer and presenting a vertical column of figures reading upwardly and progressively from 0 to 75 with a common difference of 5, a second paper chart enclosed in the lower portion of the hydrometer and presenting a vertical column of figures corresponding to the figures on the first mentioned chart but reversed to read downwardly from zero, a second column of figures extending horizontally across the top portion of said second chart with the initial figure located above and just to the right of the zero character of the vertical column, said second chart being ruled to provide a plurality of squares each contained in the vertical plane of one of the figures of the horizontal column and in the horizontal plane of one of the figures of the vertical column, each of said squares have indicia representative of a particular freezing point printed therein and a thermometer enclosed between the lower portion of the hydrometer and the chart contained therein.

In witness whereof, I have hereunto set my hand.

GEORGE G. KAESTNER.